T. DOAK.
Tree-Protector.
No. 203,898.          Patented May 21, 1878.
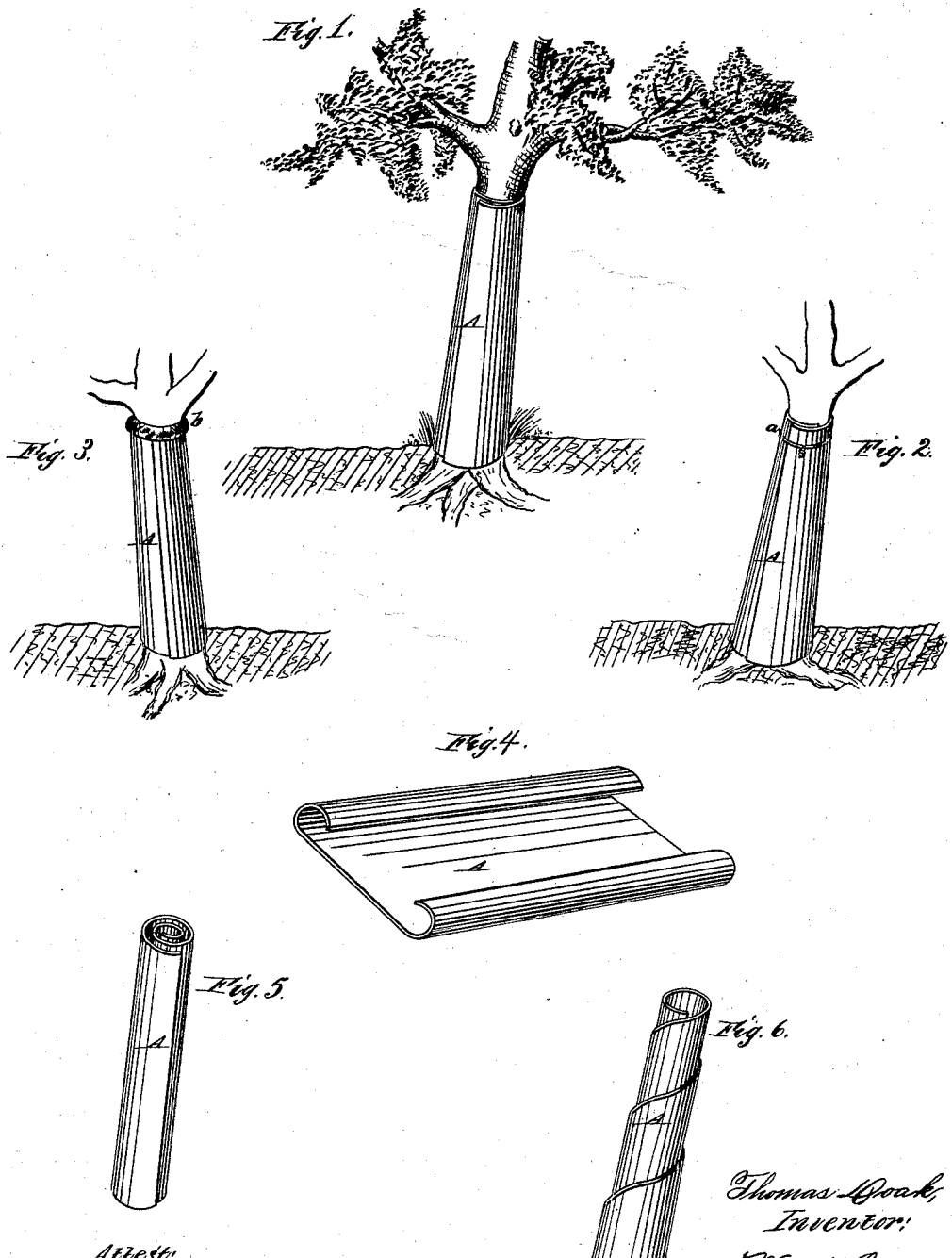

UNITED STATES PATENT OFFICE.

THOMAS DOAK, OF CAMERON, MISSOURI.

IMPROVEMENT IN TREE-PROTECTORS.

Specification forming part of Letters Patent No. 203,898, dated May 21, 1878; application filed April 16, 1878.

*To all whom it may concern:*

Be it known that I, THOMAS DOAK, of Cameron, county of Clinton, and State of Missouri, have invented certain new and useful Improvements in Devices for Protecting Trees, of which the following is a full, clear, and exact description, reference being had to the accompanying drawings, and to the letters of reference marked thereon.

Figures 1, 2, and 3 are perspective views, showing in the first the envelope surrounding the trunk of the tree, in the second the same secured at top by a wire or string, and in the third the bandage of saturated cloth applied at the top of the envelope. In each of these figures the envelope is shown as entering the ground around the base of the tree, as it is intended it should be made to do. Fig. 4 is a perspective view of the elastic envelope detached and partially spread open, ready for application to the tree; and Fig. 5 is a similar view, showing the position which the envelope assumes when unrestrained. Fig. 6 is a perspective view, showing a modified form of the envelope, in which the material is so cut as that when surrounding the tree the closing edge will assume a spiral form instead of a straight line, as in the other figures.

Like letters of reference in all the figures indicate corresponding parts.

The object of my invention is to produce a simple, cheap, and effective envelope for the bodies of fruit and such like trees; and to this end the invention consists in adapting a flexible and elastic wrapper for the purposes intended, as will be hereinafter first fully described, and then pointed out in the claims.

The envelope A is intended to be made of thin metal, of wood, paper, cloth, or other porous substance, and when made of wood, paper, &c., it should be thoroughly saturated with kerosene, pitch, rosin, or like compounds, tending to prevent the destruction of the envelope by the action of the elements, as well as to protect it against the encroachments of insects, worms, &c.

The envelope should be made rather thin and flexible, and should, when not in use around the tree, tend to roll up, so as to occupy very little space, much after the manner in which ordinary cigar-lighters are rolled.

To place the wrapper so made around the trunk of the tree, it is only necessary to open it out sufficiently to embrace the body or trunk, and then permit it to fold itself around until it thoroughly incloses the stem. If coated with pitch or like sticky substance, the edge will be firmly sealed upon the part which it overlaps, and thus no inlet will be left exposed for worms, &c., along this line.

To secure the protector at bottom, it is forced into the ground one or two inches, or more, according to the circumstances of the case; and to close the mouth securely at top, I propose to wind a string or wire, as at $a$, around the upper end, if necessary, and to draw the envelope firmly against the bark of the tree, then place a narrow band of any suitable material—preferably cloth—around the mouth, and then saturate this band $b$ with pitch, tar, &c. So long as the envelope remains upon the tree the part which it covers will be thoroughly protected; and the envelope may remain in place for an indefinite length of time, because its elastic nature will permit the growth of the body without interfering with the security of the protector.

When made of wood, the improved envelope may be shaved out, by which process (well known to veneer-cutters) the wood is caused to curl up around the edge so shaved. If made of paper or metal, this curling may be accomplished by any known mechanical means.

Instead of leaving the edge straight, the material may be so cut as to cause this edge to assume a spiral or winding course about the protector, as plainly indicated at Fig. 6, care being taken to make the envelope self-closing or elastic, as in the other instances.

When properly constructed in accordance with the foregoing description, the envelope will be light, simple in construction, occupy but very little space in shipping, be exceedingly cheap, and, it is believed, thoroughly efficient for the several purposes intended.

The construction indicated permits the use of any one size of envelope upon any tree the circumference of which is not greater than the said envelope.

The invention is to be distinguished from those devices which are no more than tight boxes considerably larger than the tree, and usually left open at the top, at which point the worms, insects, &c., can readily find an entrance. It is also to be distinguished from that class of devices which simply prevent the worms, &c., from ascending above a certain point. These may be very good for their special purposes; but they do not afford the requisite amount of protection to the body of the tree.

Having thus fully described my invention, what I claim as new, and desire to secure by Letters Patent, is—

1. The herein-described imperforate flexible and elastic envelope for trees, the same being adapted to automatically conform to the shape and size of the body of the tree by reason of its own elasticity, and being saturated or coated with pitch or the like material, as hereinbefore shown and described.

2. In combination with an imperforate flexible and elastic envelope, adapted to fit closely to the body of a tree, and to automatically conform to the size and shape thereof, an upper band of cloth saturated with pitch or the like material, the whole being confined at top and bottom in the manner explained, and adapted to prevent encroachment of insects, &c., as and for the purposes set forth.

In testimony that I claim the foregoing I have hereunto set my hand in the presence of two witnesses.

THOS. DOAK.

Witnesses:
M. KIMBALL,
E. C. SMALLEY.